United States Patent Office 3,623,182
Patented Nov. 30, 1971

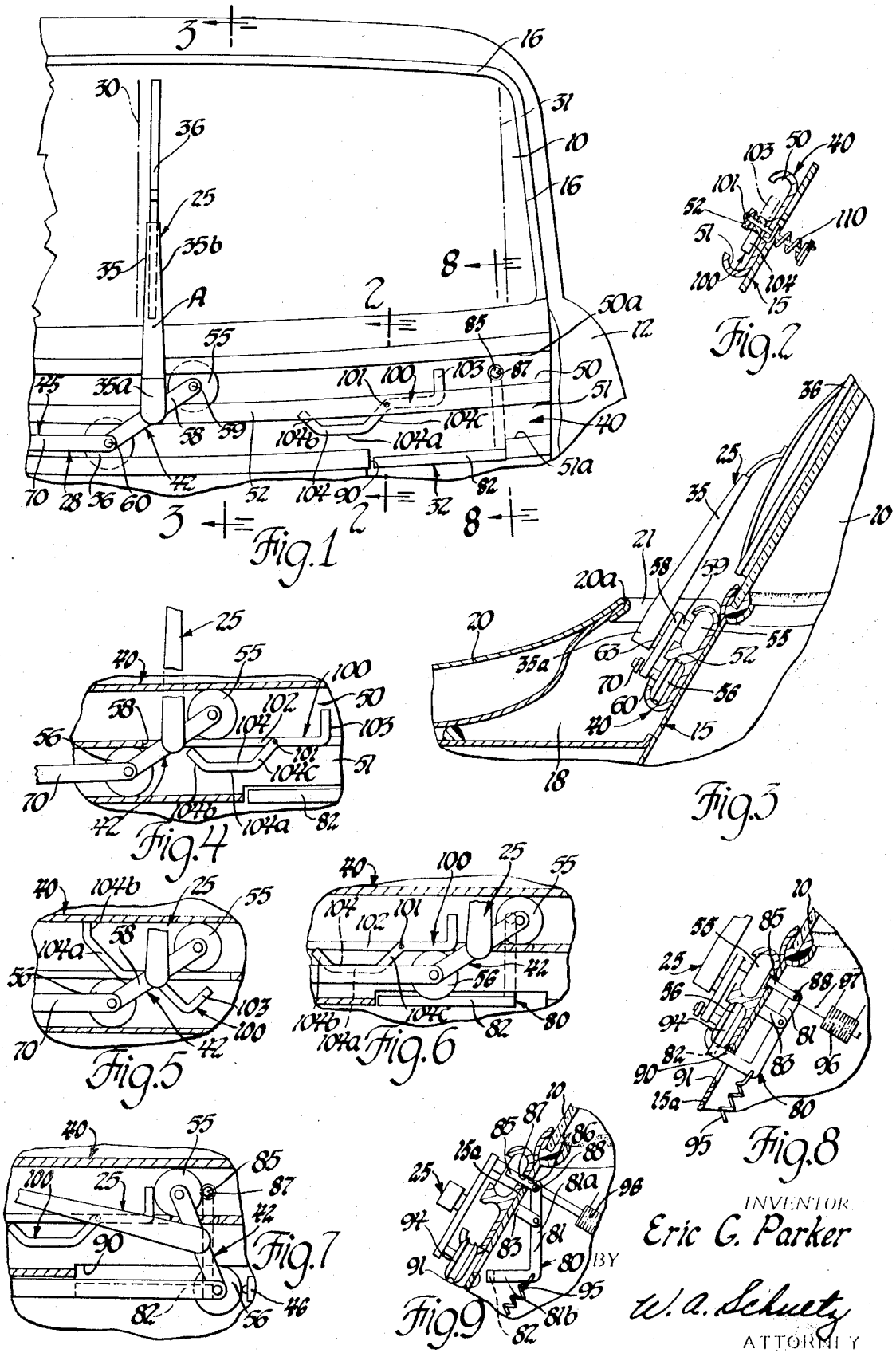

3,623,182
TRANSVERSE WIPING APPARATUS HAVING PARK LATCH PARK MECHANISM
Eric G. Parker, Kettering, Ohio, assignor to General Motors Corporation, Detroit, Mich.
Filed Aug. 27, 1970, Ser. No. 67,516
Int. Cl. A47l 1/00; B60s 1/08
U.S. Cl. 15—250.17                                    4 Claims

ABSTRACT OF THE DISCLOSURE

In a preferred form, this disclosure relates to a windshield wiping apparatus for wiping a windshield of an automotive vehicle. The windshield wiping apparatus includes a windshield wiper, an actuating mechanism for moving the windshield wiper transversely of the windshield between first and second positions while maintaining the wiper in a generally vertical disposition during running operation, and a parking mechanism for moving the wiper from its generally vertical run position to a park position adjacent the lower edge of the windshield when running operation is being terminated. The actuating mechanism includes a trolley which supports the wiper and which is guided for movement through a first path by a guide means. The parking mechanism includes a pair of latch means for holding a roller of the trolley stationary while the remainder of the trolley is pivotally moved about the roller to cause the wiper to be moved from its generally vertical run position towards its park position.

---

The present invention relates to the window wiping apparatus for wiping a window of an automotive vehicle, and in particular to a windshield wiping apparatus having a windshield wiper which is moved transversely of the windshield during running operation while being maintained in a generally vertical disposition and which is movable between its generally vertical run position and a park position adjacent the lower edge of the windshield when operation is being terminated and initiated.

Heretofore, transverse wiper systems for moving a windshield wiper transversely of the windshield while maintaining it in a vertical disposition have been provided. An advantage of such a wiper system is that a greater or substantially all of the area of the windshield can be wiped. Such wiper systems have also been provided with parking mechanism for moving the wiper from its generally vertical run position to a generally horizontal park position adjacent the lower edge of the windshield when wiper operation is terminated. For example, U.S. Pat. No. 2,785,430 shows a separate motor and drive arrangement for pivoting the wipers between their generally vertical run position and their generally horizontal park position when wiper operation is being terminated. U.S. Pat. No. 3,505,702 shows a transverse wiper system in which a parking mechanism is provided for rotating the wiper from its generally vertical run position to its park position.

Moreover, applicant's co-pending applications, Ser. Nos. 67,514 and 67,363 filed concurrently herewith, entitled Transverse Wiping Apparatus, show transverse wiper systems in which a trolley operatively connected with the wiper is reciprocated through a first path of movement while being supported and guided by a horizontal extending guide means to move the wipers transverse of the windshield between first and second positions during running operation, and in which parking of the wiper is achieved by an auxiliary guide means operatively associated with the main guide means and which causes the trolley to be moved through a second path of movement to effect movement of the wiper from its generally vertical run position toward its horizontal park position.

The present invention provides a novel transverse windshield wiping apparatus of the general type shown in applicant's aforementioned co-pending applications, but wherein a parking mechanism is provided for pivoting the trolley to cause the wiper to be moved from its generally vertical run position towards its parked position rather than an auxiliary guide means for guiding the trolley through a second path of movement.

Accordingly, an object of the present invention is to provide a new and improved windshield wiping apparatus comprising a windshield wiper, an actuating mechanism, including a trolley operatively connected with the wiper and which is supported and guided for reciprocable movement through a first path by a main guide means, for reciprocating the wiper transversely of the windshield while maintaining the latter in a generally vertical disposition between first and second positions during running operation, and a parking mechanism having latch means for holding part of the trolley stationary while allowing the remainder of the trolley to pivot thereabout to move the wipers from their generally run position to their generally park position when running operation is being terminated.

Another object of the present invention is to provide a new and improved windshield wiping apparatus, as defined in the preceding object, and wherein the trolley includes first and second rollers received in first and second guide tracks of the main guide means and a wiper support member having its opposite ends pivotally connected to the rollers, and wherein the latch means is movable between a first position in which a first part thereof is disposed within a slot in the second guide track to aid in guiding the trolley for movement through its first path during running operation and a second position in which a second part thereof is disposed within the first guide track while the second part thereof is moved from the slot of the second guide track whereby movement of the first roller of the trolley upon engaging the second part is stopped so that the remainder of the trolley pivots about the first roller to cause the wiper to be moved from its generally vertical run position toward its park position.

A further object of the present invention is to provide a new and improved windshield wiping apparatus, as defined in the next preceding object, and wherein the parking mechanism also includes a second latch means which is pivotally supported by the guide means and has portions thereof disposed within the first and second guide tracks and which is constructed and arranged such that the trolley pivots it out of the way to enable the trolley to pass thereover during running operation, but which serves to prevent reverse movement of the first roller upon being engaged by the second part of the other latch means while the trolley is being pivoted to move the wipers toward their park position.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 1 is a fragmentary front elevational view of a vehicle embodying the novel windshield wiping apparatus of the present invention;

FIG. 2 is an enlarged fragmentary sectional view taken along lines 2—2 of FIG. 1;

FIG. 3 is an enlarged sectional view taken approximately along lines 3—3 of FIG. 1;

FIGS. 4–7 are enlarged fragmentary views of part of the windshield wiper apparatus shown in FIG. 1 and showing different parts thereof in different positions;

FIG. 8 is an enlarged fragmentary sectional view taken approximately along line 8—8 of FIG. 1; and FIG. 9 is an enlarged fragmentary sectional view like that shown in FIG. 8 but showing different parts thereof in different positions.

The present invention provides a novel window wiping apparatus for wiping the window of an automotive vehicle. Although the window wiping apparatus of the present invention could be used for wiping various vehicle windows, it is particularly useful for wiping the windshield of an automotive vehicle and thus, will be herein described and shown as being used for the latter purpose.

As representing a preferred embodiment of the present invention, the drawings show a windshield wiping apparatus A for wiping a windshield 10 of an automotive vehicle 12. The windshield 10 is supported by suitable body structure 15 of the vehicle and its outer periphery is surrounded by a reveal molding 16. The body structure 15 defines a well or chamber 18 adjacent the windshield 10 at its lower edge and in which the windshield wiping apparatus A is housed. The vehicle 12 also includes a forwardly extending hood 20 whose rearward edge 20a is spaced forwardly of the windshield 10 to define a slot 21 extending transversely of the vehicle 12 and which is in communication with the well 18.

The windshield wiping apparatus A comprises, in general, a windshield wiper 25, an actuating mechanism 28 operatively connected with the windshield wiper 25 for reciprocating the latter transversely of the windshield 10 while the wiper 25 remains in a generally vertical disposition between first and second positions 30 and 31, and a parking mechanism 32 for effecting movement of the wiper 25 from its generally vertical run position to a generally horizontal park position adjacent the lower edge of the windshield 10, and vice versa, when operation is being terminated and initiated.

The windshield wiper 25 can be of any suitable or conventional construction and is here shown as comprising a windshield wiper arm 35 for carrying a wiper blade assembly 36. The windshield wiper arm 35 has spring hinged connected inner and outer sections 35a and 35b and with the outer arm section 35b biasing the wiper blade assembly 36 into engagement with the outer surface of the windshield 10.

The actuating mechanism 28 for reciprocating the windshield wiper 25 broadly comprises a main guide means 40 extending generally horizontally of the vehicle 12 adjacent the lower edge of the windshield 10; a trolley 42 for supporting the wiper 25 and which is in turn supported and guided for reciprocable movement in opposite directions through a first path by the main guide means 40; and a drive means 45 for reciprocating the trolley 42 to move the wiper 25 between its first and second positions 30 and 31.

The main guide means 40 is suitably secured to the vehicle body structure 15 and comprises integral upper and lower guide tracks 50 and 51. The guide tracks 50 and 51 are generally C-shaped as viewed in cross-section (reverse C-shaped as viewed in FIG. 3). The guide tracks 50 and 51 have a common wall 52 adjacent their lower and upper ends, respectively.

The trolley 42 is supported and guided for reciprocable movement in opposite directions by the guide tracks 50 and 51. The trolley 42 comprises a first roller 55 which is received within the first guide track 50, a second roller 56 which is received within the second guide track 51 and a wiper support or link member 58 having its opposite ends swivelly connected to stub shafts 59 and 60 rotatably carried by the rollers 55 and 56, respectively. The guide tracks 50 and 51, by virtue of their shape, have elongated side openings or slots 50a and 51a through which the pivot shafts 59 and 60 can extend. The rollers 55 and 56 are of a diameter greater than the width of the side slots 50a and 51a and thus are retained and guided within the guide tracks 50 and 51. The wiper support member 58 carries a stub shaft 63, to which the inner arm section 35a of the wiper arm 35 is non-rotatably fixed. As thus shown in FIG. 1, the rollers 55 and 56 are horizontally spaced from each other so that the wiper support member 58 is disposed at an acute angle with respect to the longitudinal axis of the guide tracks 50 and 51. The wiper 25 is fixed to the stub shaft 63 so that it is vertically disposed.

The trolley 42 is adapted to be reciprocated back and forth within the guide means 40 to move the wiper 25 between its first and second positions 30 and 31 by the drive means 45. The drive means 45 could be of any suitable construction, such as an electric motor driven endless belt drive arrangement like that shown in applicant's aforementioned co-pending applications. Since the drive means for imparting reciprocable movement to the trolley 42 does not per se form a part of the present invention, it will not be shown and described in detail. Suffice it to say that the drive means would include an input link or member 70 which would be reciprocated back and forth and has one end swivelly connected to the stub shaft 60. Energization and de-energization of the drive means 45 would, preferably, be controlled by a manually operable electric switch (not shown) in circuit with the electric motor (not shown). The circuit would also include a park switch 46 (see FIG. 7) carried by the main guide means 40, the park switch being in a parallel circuit with the electric switch to keep the electric motor energized upon moving the manual switch to its off position until the wiper reaches its park position. The park switch 46 is spring biased toward its closed position and is held in its open position when the wipers are in their park position.

In accordance with the provision of the present invention, the wiper 25 is adapted to be moved from its generally vertical run position to its park position located in the well 18 adjacent the lower edge of the windshield 10 when wiper operation is being terminated. To this end, the parking mechanism 32 is provided. The parking mechanism 32 comprises a first latch means 80 operatively associated with the guide means 40. As best shown in FIGS. 8 and 9, the latch means 80 comprises a first member or part 81 having an L-shaped portion and a rod portion 82. One leg 81a of the L-shaped portion 81 is pivotally secured to a member 83 carried by the vehicle body structure 15. The other leg 81b is welded or rigidly secured to the rod portion 82. The latch means 80 further includes a second member or part 85 which is in the form of a pin and is slidably received in aligned openings 86 and 87 in the panel 15a and the guide track 50. The member 85 has one end pivotally connected to the free end of the longer leg 81a of the L-shaped member by a pivot pin means 88.

The first latch means 80 is movable between first and second positions. When in its first position, as shown in FIG. 8, the rod portion 82 is received within a slot 90 at the bottom of the guide track 51 and the pin 85 is not disposed within the guide track 50. The panel 15a is provided with a suitable elongated slot 91 through which the rod 82 can move. The rod 82 serves to guide the bottom roller 56 of the trolley 42 through its first path of movement when in its first position. To this end, the bottom roller 56 has a circumferential groove 94 which rides on the rod 82 when the latter is in its first position. When the latch means 80 is in its second position, as shown in FIG. 9, the pin member 85 is disposed within the guide track 50 and the rod member 82 is located away from the bottom of the guide track 51.

The latch means 80 is spring biased toward its first position, as shown in FIG. 8. To this end, a tension spring 95 having one end connected to the L-shaped member 81 and its opposite end connected to a stationary support (not shown) is provided. The latch means 80 is movable from its first position, as shown in FIG. 8, towards its second position, as shown in FIG. 9, and in opposition to the biasing force of spring 95 by a solenoid 96. The solenoid 96 includes a suitable core 97 having one end which is pivotally connected to the pivot pin means 88. When the solenoid 96 is energized, the core is moved toward the left which causes the L-shaped member 81 to pivot in a counterclockwise direction and the pin 85 to be moved through the opening into the main guide track 50.

The parking mechanism 32 also includes a second latch means or member 100. The latch member 100 is pivotally connected to the common wall 52 on the main guide track by a pivot pin means 101 and is pivotally movable through a slot 102 in the common wall 52. The latch member 100 has an L-shaped portion 103 and with its longer leg normally disposed parallel with the common wall 52 and its shorter leg extending normal thereto and into the guide track 50. The latch member 100 also has a dish-shaped portion 104 which extends within the guide track 51. The dish-shaped portion 104 has a flat bottom 104a which is spaced from and disposed parallel to the common wall 52 and sloping portions 104b and 104c which diverge with respect to each other as they proceed from the bottom 104a toward the common wall 52.

The latch member 100 is normally spring biased to the positions shown in FIGS. 1 and 4 by a torsion spring 110. The torsion spring is disposed around the pivot means 101 and has one end in engagement with the latch member 100 and its other end in engagement with the guide means 40.

During running operation the latch means 80 is spring biased by the spring 95 towards its first position, as shown in FIG. 8, in which the rod portion 82 is disposed within the slot 90 and in which the pin 85 is not disposed within the guide track 50. When in this position the rod portion 82 serves to guide the lower roller 56 of the trolley 42 through its path of movement in the guide track 51. Also, during running operation the latch member 100 does not interfere with the movement of the trolley 42. This is because the latch member 100 will be pivoted in a clockwise direction by the roller 56 of the trolley 42 as the latter moves thereby in either direction which in turn causes the short leg 103 to move out of the path of movement of the first wheel 55 of the trolley 42.

As can be seen from FIGS. 4–6, when the trolley 42 is moved toward the right its second roller 56 will engage the side 104b of the dish-shaped portion 104 to cause the latch member 100 to be pivoted in a clockwise direction. As the latch member 100 is pivoted in a clockwise direction the dish-shaped portion 104 is moved upwardly into the guide track 50 while the L-shaped portion 103 is moved downwardly out of the guide track 50. The L-shaped portion 103 is thus moved out of the path of movement of the first wheel 55 prior to the latter contacting it. When the wheel 56 of the trolley 42 is moved past the dish-shaped portion 104 the torsion spring 110 will return the latch member 100 to its normal position, as shown in FIGS. 1 and 4. This occurs at about the time the wheel 56 would engage the L-shaped portion 103.

Likewise, when the trolley 42 is moved toward the left the roller 56 thereof will engage the side 104c of the dish-shaped portion 104 to cause the latch member 100 to be pivoted in a clockwise direction. This movement of the latch member 100 causes the L-shaped portion 103 to be moved out of the main guide track 50 to enable the roller 55 to move therepast. When the second wheel 56 moves out of engagement with the bottom surface 104a of the latch member 100 as the trolley 42 is moved toward the left, the torsion spring 110 will return the latch member 100 towards its normal position, as shown in FIG. 4.

When wiper operation is no longer desired the operator will move the manual control switch (not shown) to its off position. The drive means, however, remains energized since the parking switch 46 is in its open position and thus keeps the parallel circuits to the drive unit energized. Also, when the control switch is moved to its off position the solenoid 96 is energized, the latter being in series circuit with the park switch 46. Energization of the solenoid 96 causes the latch means 80 to be moved from its first position, as shown in FIG. 8, to its second position, as shown in FIG. 9, in which the pin member 85 is disposed within the guide track 50 and the rod member 82 is moved away from the slot 90.

As the trolley 42 approaches its rightmost end travel position the roller 55 thereof will engage the pin member 85. This engagement occurs prior to the trolley 42 having been moved to its rightmost end travel position. Since the drive link 70 continues to move toward the right, the wiper support member 58 and the roller 56 will pivot about the axis of the shaft 59 of the roller 55 in a counterclockwise direction, as viewed in FIGS. 1 and 7. This movement is now permitted since the rod member 82 is no longer disposed within the slot 90. As the remaining portion of the trolley 42 is pivoted in a counterclockwise direction, the wiper 25 is caused to be moved from its generally vertical run position toward its generally horizontal park position adjacent the lower edge of the windshield, as shown in FIG. 7. When in the park position, the wiper 25 is disposed within the slot 21 so as to be concealed from view.

When the roller 56 is in the position shown in FIG. 7, it engages the park switch 46 to open the same and thus de-energize the drive motor (not shown) and the solenoid 96. It should be noted that during this pivotal movement of the trolley 42 about the roller 55 that reverse movement, i.e., movement toward the left by the roller 55, is prevented since the roller engages the short leg of the L-shaped portion 103 of the latch member 100.

When wiper operation is initiated, the reverse movement of the trolley 42 takes place. That is, the trolley will be pivoted in a clockwise direction about the axis of the roller 55 until it is again disposed within the guide track 51. Also, the latch means 80 which is biased towards its first position will engage the roller 56 and thus, is held from moving towards its first position until the roller 56 is received within the guide track 51 whereupon the rod member 82 will again be received within the groove of the roller 56.

Although only the wiper 25 is shown and described, it will, of course, be understood that a second wiper for wiping the left side of the windshield, as viewed in FIG. 1, and which is driven and parked in an identical manner to the wiper 25 would be provided. Alternately, the other wiper could be pivotally mounted on its associated trolley and interconneceed with the wiper 25 by a parallel linkage arrangement. This would eliminate the need for two parking mechanisms.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A windshield wiping apparatus for wiping a windshield of an automotive vehicle comprising: a windshield wiper, an actuating mechanism for moving the windshield wiper transversely of the windshield between first and second positions while maintaining the wiper in a generally vertical disposition during running operation, said actuating mechanism comprising a generally horizontally extending guide means adjacent the lower edge of the windshield, said guide means having upper and lower guide tracks, a trolley supported and guided for reciprocable movement through a first path by said guide means, said trolley comprising first and second rollers which are received in said upper and lower guide tracks and a wiper support member pivotally connected at its opposite ends to said first and second rollers, said wiper being operatively connected with said wiper support member, drive means operatively connected with the trolley for reciprocating the latter, and a park mechanism for moving the wiper from its generally vertical run position to a park position adjacent the lower edge of the windshield when running operation is being terminated, said park mechanism including means operatively associated with said guide means and movable between a first position in which it aids in guiding said trolley through its first path of movement and a second position in which it prevents further movement of one of said rollers of said trolley through said first path and allows the remainder of said trolley to pivot about said one roller as said drive means causes said trolley to be further moved whereby said wiper is caused to be moved from its generally vertical run position towards its park position.

2. A windshield wiping apparatus for wiping a windshield of an automotive vehicle comprising: a windshield wiper, an actuating mechanism for moving the windshield wiper transversely of the windshield between first and second positions while maintaining the wiper in a generally vertical disposition during running operation, said actuating mechanism comprising a generally horizontally extending guide means adjacent the lower edge of said windshield, said guide means having upper and lower guide tracks, a trolley supported and guided for reciprocable movement through a first path by said guide means, said trolley comprising first and second rollers which are received in said upper and lower guide tracks and which roll along the bottom surface of said guide tracks, said trolley further including a wiper support member pivotally connected at its opposite ends to said first and second rollers, said wiper being operatively connected with said wiper support member, and drive means operatively connected with said trolley for reciprocating the latter; and a park mechanism for moving the wiper from a generally vertical run position to a park position adjacent the lower edge of the windshield when running operation is being terminated, said parking mechanism including a latch means having first and second parts and which is movable between first and second positions, said first and second parts of said latch means being respectively received within a slot in the bottom of said second guide track and out of the path of movement of said trolley when said latch means is in said first position, said latch means when in said second position having its first part away from the bottom of said second guide track and said second part disposed within the first guide track, means for effecting movement of said latch means between its positions, said first part of said latch means being operable to guide said second roller through its first path when in said first position, said second part of said latch means being operable to prevent further movement of said first roller of said trolley and cause the remainder of said trolley to be pivoted about said first roller through said slot in said second guide track and hence said wiper toward its parked position when said latch means is in said second position.

3. A windshield wiping apparatus for wiping the windshield of an automotive vehicle comprising: a windshield wiper, an actuating mechanism for moving the windshield wiper transversely of the windshield between first and second positions while maintaining the wiper in a generally vertical disposition during running operation, said actuating mechanism comprising a generally horizontally extending guide means adjacent the lower edge of the windshield, said guide means having upper and lower guide tracks and with the lower surface of the upper guide track and the upper surface of the lower guide track being defined by a common wall, a trolley supported and guided for reciprocable movement through a first path by said guide means, said trolley comprising first and second rollers received in said upper and lower guide tracks and a wiper support member pivotally connected at its opposite ends to said first and second rollers, said rollers being rollable along the bottom surfaces of said guide tracks and being horizontally spaced apart, said wiper being operatively connected with said wiper support member, and drive means operatively connected with said trolley for reciprocating the latter; and a park mechanism for moving the wiper from its generally vertical run position toward a park position adjacent the lower edge of the windshield when running operation is being terminated, said parking mechanism including a latch member pivotally connected to said common wall of said first and second guide tracks, said latch member being spring biased toward a normal position in which a first portion thereof is disposed within said second guide track and a second portion thereof extends within said first guide track, said first and second portions being movable through a slot in said common wall, said latch member being pivotally movable from its normal position toward a second position in which said second portion thereof is disposed within said first guide track in response to said second roller engaging said first portion whereby said first roller is free to pass over said second portion to enable said trolley to be moved therepast during running operation, said parking mechanism also including a latch means movable between a first position in which a first part thereof is received within a slot in the bottom of said second guide track and a second part thereof is not disposed within said first guide track and a second position in which said first part is away from said bottom of said guide track and said second part is disposed within the first guide track, said first part of said latch means preventing further movement of said first roller through its path of movement when in its second position and causing the remainder of the trolley to be pivotally movable about the first roller through said slot in said second guide track in response to continued movement of said trolley by said drive means to thereby cause said wiper to be moved from its generally vertical run position towards its park position, said second portion of said latch member preventing reverse movement of said first roller upon the latter being stopped by said second part of said latching means.

4. A windshield wiper apparatus as defined in claim 3 wherein said second roller is circumferentially grooved and said first part of said latch means is a rod which serves to guide the second roller through its first path of movement when the latch means is in its first position.

References Cited
UNITED STATES PATENTS

| | | | |
|---|---|---|---|
| 1,661,388 | 3/1928 | Sather | 15—250.29 X |
| 3,078,494 | 2/1963 | Price | 15—250.26 X |
| 3,505,702 | 4/1970 | Omlie et al. | 15—250.29 X |

PETER FELDMAN, Primary Examiner

U.S. Cl. X.R.

15—250.29